(12) United States Patent
Perchak

(10) Patent No.: US 6,515,783 B2
(45) Date of Patent: Feb. 4, 2003

(54) PENTA ASSEMBLY SKEW COMPENSATOR

(75) Inventor: Robert M. Perchak, Dayton, OH (US)

(73) Assignee: Mirage Development, Ltd., Dayton, OH (US)

(*) Notice: Subject to any disclaimer, the term of this patent is extended or adjusted under 35 U.S.C. 154(b) by 37 days.

(21) Appl. No.: 09/920,548

(22) Filed: Aug. 1, 2001

(65) Prior Publication Data
US 2002/0030880 A1 Mar. 14, 2002

Related U.S. Application Data

(60) Provisional application No. 60/224,187, filed on Aug. 9, 2000.

(51) Int. Cl.[7] ............................................... G02B 26/08
(52) U.S. Cl. ....................... 359/212; 359/641; 359/223
(58) Field of Search ..................... 359/641, 726–733, 359/735, 196–226, 900

(56) References Cited

U.S. PATENT DOCUMENTS 5,367,399 A * 11/1994 Kramer ...................... 359/212

* cited by examiner

Primary Examiner—James Phan
(74) Attorney, Agent, or Firm—Joseph G. Nauman

(57) ABSTRACT

Correction is provided for a curved or skewed scan output from a penta assembly in an instrument that scans a beam in a predetermined fashion. The penta assembly has first and second beam directing surfaces supported at a predetermined angle to each other. A laser beam source directs a beam along a path preferably coinciding with the scanning axis of said mount toward the first surface, and a first optical element converges the input beam to a spot on that first surface. Then the reflection or redirection of such spot is transmitted onto the second surface, and finally the redirected beam from that second surface is transformed into a collimated output beam from the penta assembly. This is accomplished using simple passive optical elements, e.g. convex lenses or optical equivalents, which are readily incorporated into the penta assembly.

7 Claims, 1 Drawing Sheet

PENTA ASSEMBLY SKEW COMPENSATOR

RELATED APPLICATIONS

This application is based upon U.S. Provisional Patent Application Serial No. 60/224,187 filed Aug. 9, 2000.

BACKGROUND OF THE INVENTION

This invention relates to laser beam level instruments, of which a typical example is illustrated and described in U.S. Pat. Nos. 4,062,634 and 4,221,483 of Joseph F. Rando et al, issued to Spectra-Physics Inc. Such instruments sweep a laser beam in a horizontal plane, and are typically used in surveying and construction industries. They utilize a penta mirror or a penta prism (e.g. a penta assembly) which always directs the incoming beam through essentially a right angle, as long as the incoming beam is within the plane that contains the normal to each reflecting surface (hereinafter called the plane of the penta assembly). It has been desired, particularly in applications where the penta assembly is used in continuous rotation such as in surveying laser applications, to have the penta assembly reflect light through a right angle with an incoming beam that is out of the plane of the penta assembly.

In a typical surveying laser application, the input laser beam is directed upward (or downward) towards the first reflecting surface, e.g. a penta assembly mirror or a penta prism assembly. This penta assembly is typically supported to rotate by suitable bearing(s) and is fastened to the base or support of the aligning apparatus which is only approximately level, e.g within less than or equal to 5°. Although the structure is not perfectly level, the input beam is automatically compensated by another apparatus (not shown) so as to be precisely plumb, i.e. within some very small tolerance. Since the structure, and hence the penta assembly, is not precisely level and the compensating apparatus has set the vertical beam to be precisely plumb, some angle then exists between the vertically plumb laser beam and the plane of the penta assembly.

There are two configurations for a penta assembly, namely mirror or prism. One configuration utilizes an obtuse inclusive angle between the reflecting or mirror surfaces of 135° and the other configuration (the most common and a more compact design) utilizes an included acute angle of 45°. This latter configuration is shown schematically in FIG. 1, labeled Prior Art, and embodies a penta assembly including mirror surfaces M1 and M2. For purposes of this description the more common configuration is shown, but the principles of the invention are applicable to the other configuration using an obtuse inclusive angle. It should also be understood that the acute 45° angle is exemplary, but may vary according to a desired result.

To show the precise nature of the compensation problem in detail is graphically difficult, but the principle may be illustrated generally as shown in FIG. 2. For purposes of simplified explanation, consider the condition when the incoming beam B1 lies within the plane of the normal of mirror M1 and mirror M2. In the three dimensional view (FIG. 2) the incoming beam (typically a collimated beam as from a laser source) is directed upward onto mirror M1 and is reflected through 45° towards mirror M2. These mirrors preferably are 'first surface' mirrors. The beam is then reflected again through 45° by mirror M2 and exits the penta assembly at 90° from its original input direction. If the angle of the incoming beam B1 is changed within the plane of the penta assembly, then the outgoing beam B2 will again be at a right angle to the incoming beam. It is this fact that makes the penta assembly so useful in creating an optical plumb.

If an apparatus is used that always generates a plumb beam and lies within the plane of the penta assembly, then the output beam will always be normal to plumb and can be called level. Assuming a condition wherein input beam B1 is plumb and lies in the plane of the penta assembly on the optical axis, then it is necessary to consider what happens as input beam B1 is moved within a plane that contains the optical axis and is perpendicular to the plane of the penta assembly. As the beam moves in this latter plane away from the optical axis, the reflection from the first mirror M1 is directed at an equal angle away from the normal to the first mirror M1 (e.g. the principle of reflection). This reflected light does not describe a line on the second mirror M2, but actually describes an arc as shown in FIG. 2. This arc is magnified over the distances that the apparatus may be required to operate; thus the scanning output laser beam will not be precisely straight in some locations along the scan.

Thus, light reflected from the second mirror M2 (the output of the penta assembly) then describes an arc SKi (i.e. skew) in the viewing plane normal to the optical axis. It is this arcuate trace of the output beam, from the second mirror, that is undesirable since it is not straight, but slightly curved.

SUMMARY OF THE INVENTION

It is the principal object of this invention to provide a means to allow the penta assembly always to reflect the incoming beam through essentially a right angle regardless whether or not the incoming beam lies in the plane of the penta assembly. In other words, the purpose of this invention is to reduce or eliminate such curvature of the output beam trace as described above.

It is important to recognize where this skew originates. Since it is caused by the description of an arc on the second mirror M2, if an optical element or elements is devised to eliminate such arcuate trace, the skew can be eliminated. Recalling that when the beam moves within the plane of the penta assembly, the motion of the beam on the mirror surface M2 is in a line on that second mirror and in the plane of the penta assembly, it follows that no compensation is needed in this plane. But, compensation is required for any ray outside of the plane of the penta assembly.

The present invention provides such compensation by reducing the input beam to the penta assembly to a spot on the first mirror M1, then directing the reflection of such spot to the second mirror M2, then translating the reflected beam from mirror M2 as a collimated output beam from the penta assembly. This is accomplished using simple passive optical elements, e.g. convex lenses or optical equivalents, which are easily incorporated into a penta assembly.

DESCRIPTION OF THE PREFERRED EMBODIMENT

Figure 1:
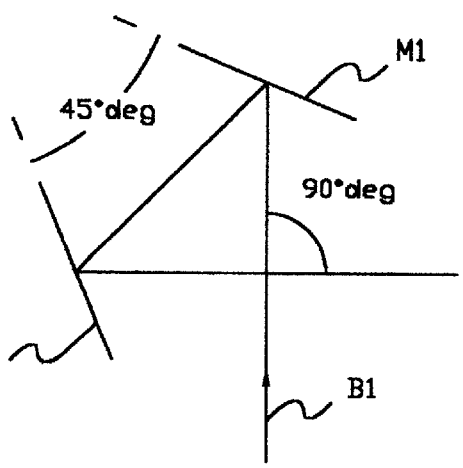
FIG. 1 is a diagrammatic view of a typical penta assembly.
Figure 2:
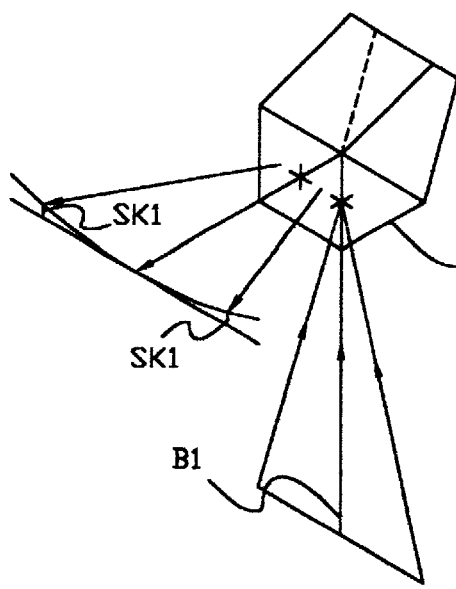
FIG. 2 is a diagrammatic view illustrating the unwanted deviation or skew of the scanned output beam of the typical prior art penta assembly.
Figure 3:
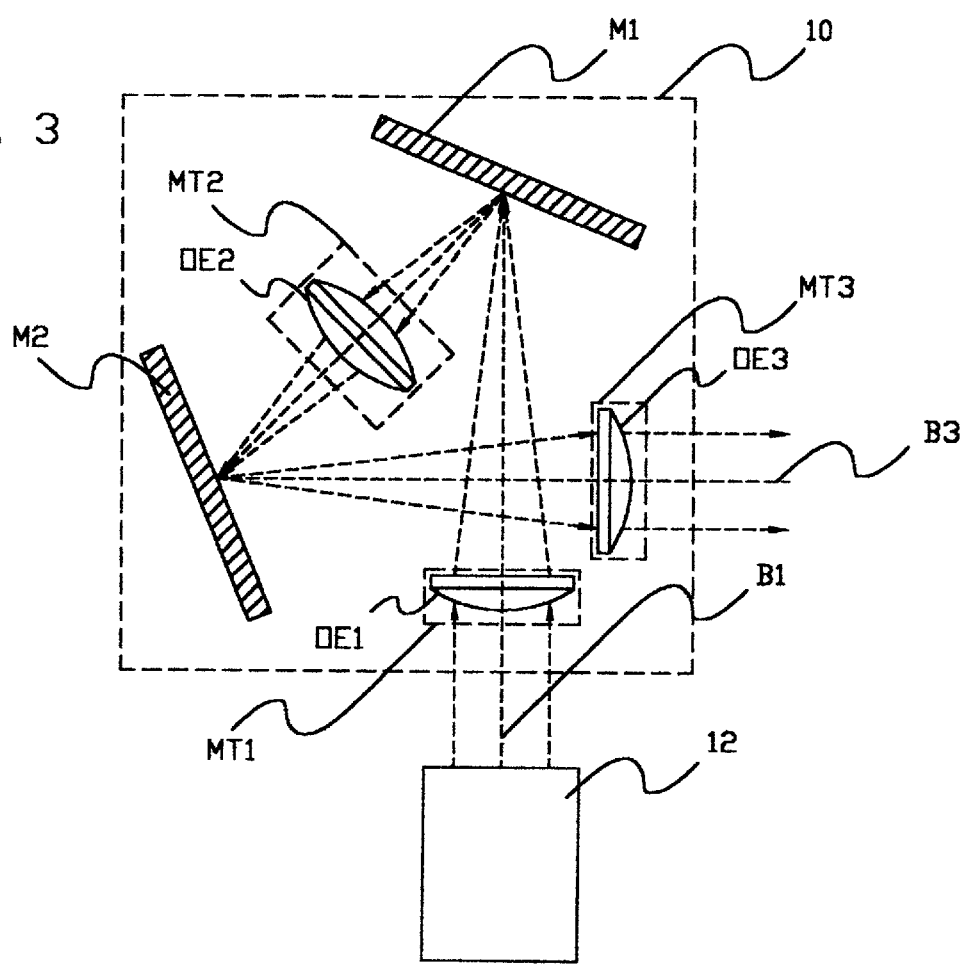
FIG. 3 is a diagrammatic view showing the fully compensating arrangement of the invention.

It should be understood that the term 'optical element' as used in this description refers to lenses as well as equivalents thereof such as holograms or optical diffracting devices which are capable of producing the same result.

Mirrors M1 and M2 are supported in a case 10 which includes an entrance window W1 and exit window W2 appropriately aligned with the mirrors. A laser light source 12 directs a collimated input beam B1 to entrance window W1. By converging input beam B1 onto mirror M1, e.g. at the focal point of a first optical element OE1 intercepting the input beam B1, any motion outside the plane of the penta assembly will simply cause the beam to converge at a different location (i.e. dislocate) on that mirror, but not produce a line on mirror M1.

Then, the converged beam when reflected off mirror M1 can be directed onto mirror M2 via a second optical element OE2, preferably converged on mirror M2 with an opposite dislocation. The beam is still caused to trace a straight line on mirror M2, and to be reflected therefrom into a third optical element OE3 which transforms that reflected light into a collimated output beam B3. Beam B3 will then trace a straight line if scanned, as by rotation or dithering of the penta assembly, e.g. case 10.

Therefor the penta assembly can, by the addition of these optical elements, be fully compensated to prevent curvature or skewing of the output trace as the beam is scanned out of the plane of the penta assembly.

In a preferred embodiment of the invention, the optical elements OE1, OE2 and OE3 can be appropriate convex (positive) lenses added into the rotatable penta assembly and adjustably supported in mounts MT1, MT2, and MT3, respectively, to intercept and transform the input beam B1 from laser source 12, and the reflected light from mirrors M1 and M2. as Mentioned above, other optical elements which are the equivalents of the lenses can be employed. The adjustment feature of the mounts provides for accurate set-up alignment of the optical elements, and in most cases will not be used to vary the beam or its path once the optical system is precisely aligned during manufacture and assembly.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. In a penta assembly for directing an input light beam along a predetermined path through a precise angle and then scanning the beam in a plane essentially normal to the axis of the input beam, said assembly including an entrance aperture and an exit aperture, first and second beam directing surfaces supported in said assembly at a predetermined angle to each other, the assembly being carried in a scanning mount, a light source for directing a beam along a beam path through said entrance aperture and onto the first surface, whereby the beam is diverted onto and from said second surface and through said exit aperture;

the improvement comprising a first optical element located along said entry aperture and acting to converge the beam onto said first surface, a second optical element located along said beam path between said first and second surfaces, and a third optical element located at said exit aperture and acting to collimate the beam and to direct the collimated output beam along a scanning path.

2. The invention defined in claim 1, wherein said surfaces are reflective elements.

3. The invention defined in claim 1, wherein at least the first and second said optical elements are convex lenses.

4. The invention defined in claim 1, wherein at least the second optical element is supported in said penta assembly by an adjustable mount.

5. The invention defined in claim 4, wherein all the optical elements are supported in said penta assembly by independent adjustable mounts.

6. In a penta assembly for directing an input light beam along a predetermined path through a precise angle and then scanning the beam in a plane essentially normal to the axis of the input beam, said assembly including a housing having an entrance aperture and an exit aperture, first and second beam directing surfaces supported in said housing at a predetermined angle to each other, a scanning mount supporting said housing, a light source for directing a beam along a beam path coinciding with the axis of scanning of said mount through said entrance aperture and onto the first surface, said first surface diverting the beam onto said second surface and said second surface diverting the beam through said exit aperture;

the improvement comprising a first lens element located along said entry aperture and acting to converge the beam onto said first surface, a second lens element located along said beam path between said first and second surfaces, and a third lens element located adjacent said exit aperture and acting to collimate the beam and to direct the collimated output beam from said housing along a scanning path.

7. The method of correcting a curved scan output from a penta assembly having first and second beam directing surfaces supported at a predetermined angle to each other, the assembly being carried in a scanning mount, and a laser beam source directing a beam along a predetermined path onto the first beam directing surface whereby the beam is directed from the first surface onto and from the second surface, comprising focusing the beam from the source onto the first directing surface, then focusing the reflected beam from the first directing surface as a spot on the second directing surface, then restoring the reflected beam from the second directing surface into a collimated beam exiting the penta assembly.

* * * * *